June 22, 1926.
C. E. BRIDWELL
CHUCK
Filed Feb. 23, 1923
1,589,355
2 Sheets-Sheet 1
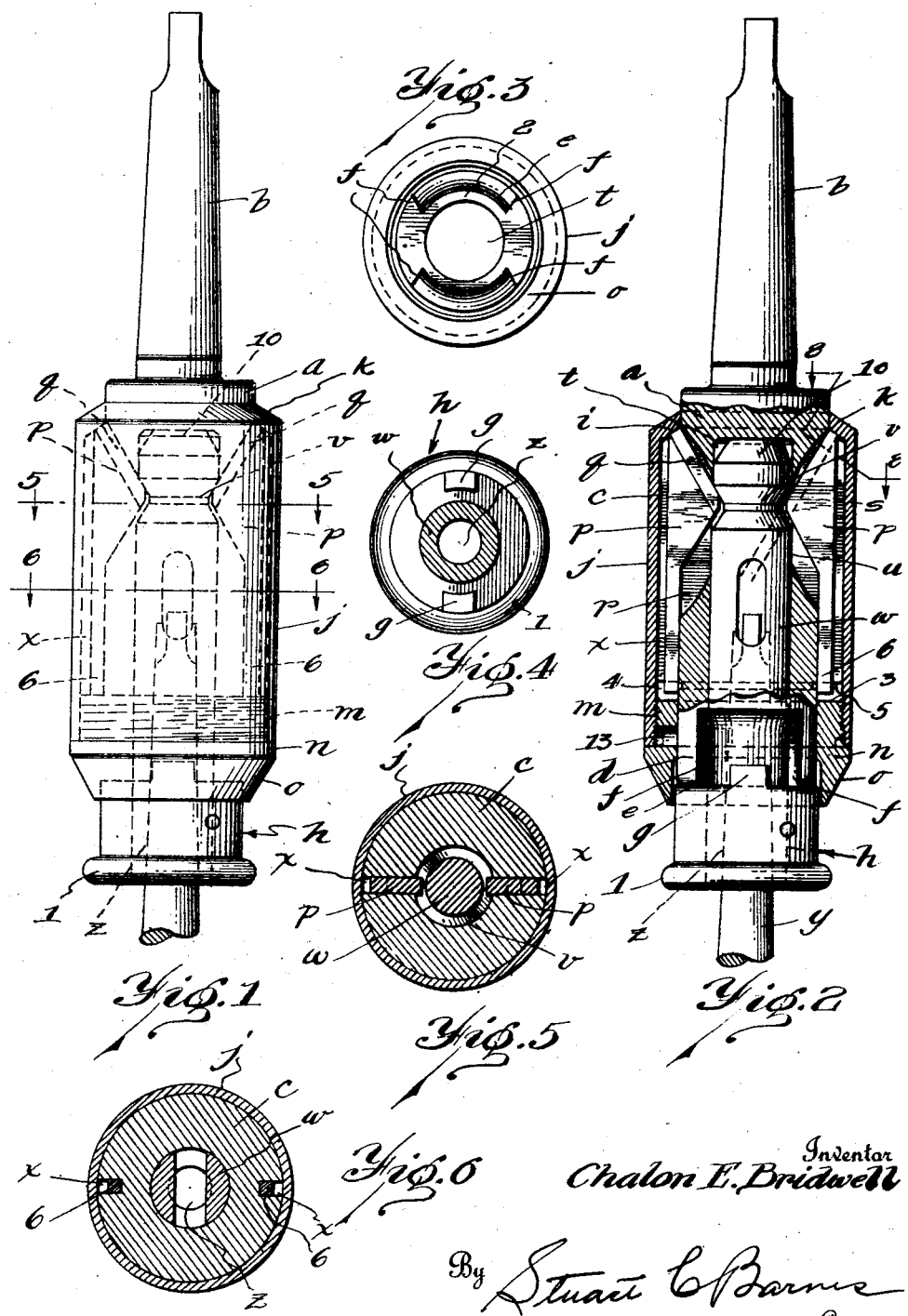
Inventor
Chalon E. Bridwell
By Stuart C. Barnes
Attorney

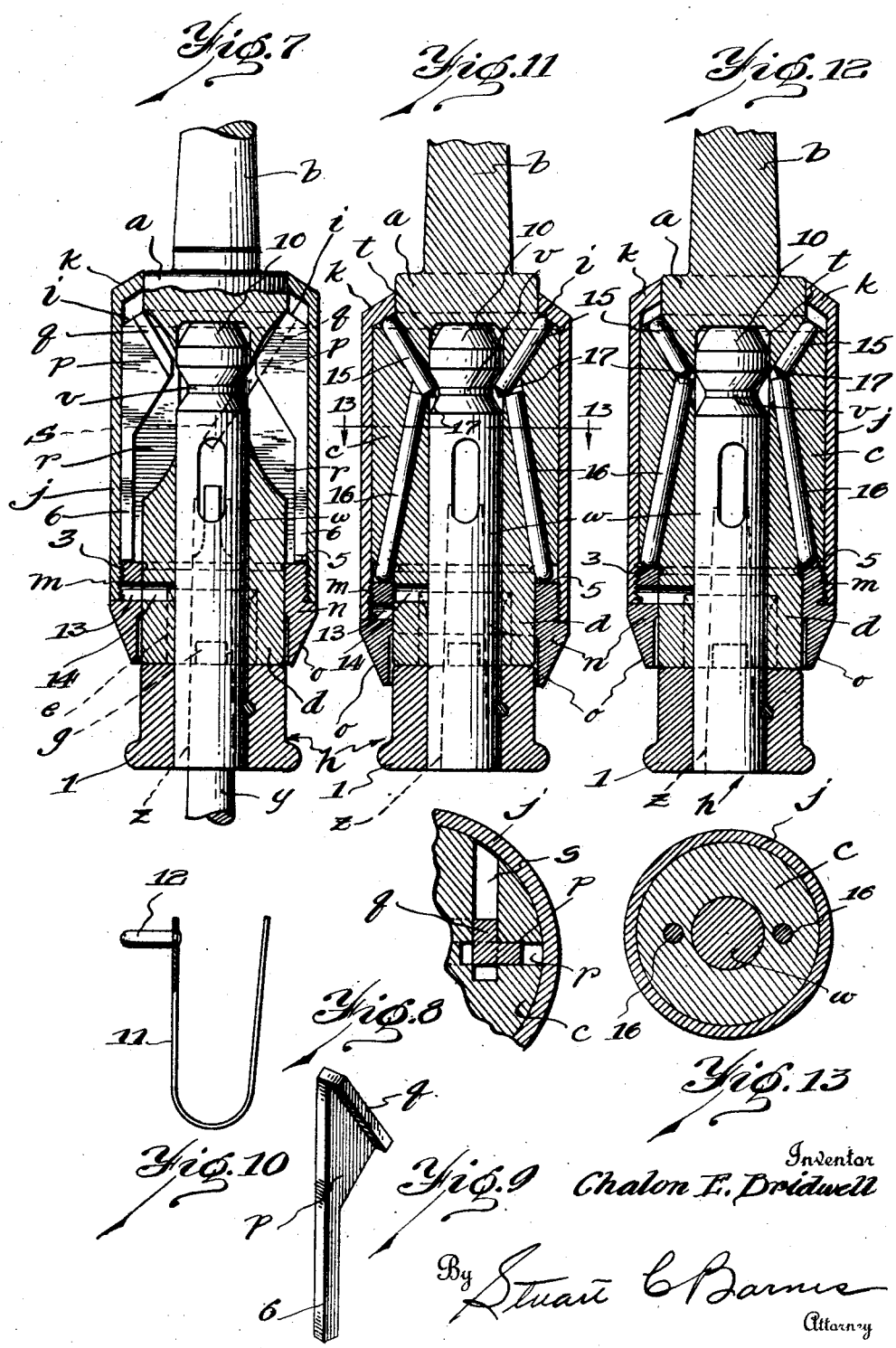

Patented June 22, 1926.

1,589,355

UNITED STATES PATENT OFFICE.

CHALON E. BRIDWELL, OF DETROIT, MICHIGAN.

CHUCK.

Application filed February 23, 1923. Serial No. 620,658.

This invention relates to chucks and more particularly to a quick releasing chuck for disengaging a tool in order to replace with a different sized tool.

The object of the invention is to provide a chuck that can be manually actuated by one hand. A further object is to so construct the gripping element and control thereof that the tool may be thrust into the chuck and securely held therein, the gripping element of the chuck automatically engaging with the tool shank to hold the same in place. The chuck is so arranged that a mere gripping of the tool and sleeve with the consequent raising of the sleeve or shell will actuate the chuck to release the tool so that it may be withdrawn from the holder without the actuation of any chuck parts with the other hand.

Another object is to locate the chuck parts entirely within the shell of the chuck so that there is no danger of the operator's hands coming in contact with any of the rotating chuck parts. The shell of the chuck is so arranged that the same may be grasped by the hand since the moving chuck parts are contained within the shell and rotate freely therein.

A still further object is to provide means for disassembling the chuck for replacing worn parts without marring the outside surface of the shell for it is desirable to always keep this surface smooth and unmarred so that there are no rough edges or projections to prevent the operator from safely gripping the chuck with his hand.

Most of the chucks used to-day necessitate the use of both hands in actuating the chuck to release the tool from the holder. Numerous means are provided for gripping the tool and holding the same within the chuck but most of these require a twisting or partial rotation of the chuck shell or sleeve in order to release the gripping member from engagement with the tool in order to withdraw the same from the holder.

There have been chucks put on the market which aim to accomplish the releasing of the tool with the use of only one hand, but these chucks have not proved satisfactory since they have too many parts, are not easily operated, and cannot be positively actuated without some additional means; i. e., they sometimes depend upon the rotation of the drill press driving member to provide a twisting action to release the clutch gripping parts. The chuck I refer to is one in which the chuck may be gripped by the operator as the same is rotating, the chuck being retarded slightly as the operator grips the chuck whereby the driving member of the drill press rotates the holder within the chuck shell thereby providing a relative twisting movement between the holder and shell and causing a key member to be retracted from engagement with a lug key carried by the shell to allow the gripping parts of the chuck to fall away and release the tool.

Having this construction in mind, I have provided the present construction as disclosed in the following specification to overcome the difficulties existing in the different chucks now on the market and in addition I have provided a chuck which contains gripping elements that can be actuated without a twisting movement.

In the drawings:

Fig. 1 is a side elevation of the chuck showing the tool and gripping element in engagement in dotted lines.

Fig. 2 is a longitudinal section therethrough.

Fig. 3 is an end view of the chuck with the tool removed showing the driving member of the clutch.

Fig. 4 is an end view of the tool partly in section showing the lugs for engagement with the driving parts.

Fig. 5 is a section on the line 5—5 of Fig. 1.

Fig. 6 is a section on the line 6—6 of Fig. 1.

Fig. 7 is a longitudinal sectional view similar to Fig. 2 but showing the gripping member retracted so as to release the tool from the tool holder.

Fig. 8 is a section on the line 8—8 of Fig. 2, showing the guide-way for the gripping member.

Fig. 9 is a detail in perspective of one of the gripping members.

Fig. 10 is a detail of the tool used in disassembling the chuck for replacing worn parts.

Fig. 11 is a longitudinal sectional view showing a modified form of construction.

Fig. 12 is a longitudinal sectional view similar to Fig. 11 but showing the gripping members in retracted position.

Fig. 13 is a transverse section on the line 13—13 of Fig. 11.

The chuck comprises a holder *a* provided with a tang *b* which is adapted to fit in a socket in the drill press head and may hereinafter be designated as the driving member. The holder is provided with an enlarged central portion *c* and a reduced end portion *d* that is provided with a milled out slot *e* forming the driving shoulders *f* which are adapted to be engaged by a projection *g* carried by the tool designated *h*.

The enlarged central portion *c* is provided at its upper edge with a bevelled shoulder *i* for a purpose to be hereinafter described. The shell or sleeve *j* is provided with the inwardly extending conical flange *k* adapted to engage with the bevelled shoulder *i* to limit the downward movement of the shell when in place on the holder. The lower end of the shell is threaded as at *m* and a plug *n* is screwed therein, said plug provided with a bevelled lower portion *o* and fitting around the reduced end portion *d* of the holder or driving member. A pair of keys *p* provided with laterally extending and elongated tongues *q* are adapted to be slidably supported within the enlarged portion *c* of the tool holder *a* in suitable key-way slots about to be described.

A longitudinal and radial key-way slot *r* is milled in the tool holder and another slot is milled at right angles to the milled slot *r* designated as *s* (see Fig. 8) and at an angle of substantially 30 degrees to the axis of the tool.

The tool holder is provided with a central recess *t* (see Fig. 2) in which the shank *w* of the tool *h* is received. The key-way slots are of a sufficient depth so as to break through into this recess *t* as at *u*. The keys *p* are adapted to project within the recess *t* and to engage the annular groove *v* carried by the shank *w* of the tool. When the keys *p* are in engagement with the groove carried by the tool shank, the outer edge of the key is spaced from the shell or sleeve *j* as at *x* to allow sufficient clearance for the retraction of the key from the groove *v*.

For convenience in manufacturing I have made the tool *h* in several parts consisting substantially of a sub tool holder or shank *w* provided with a tapered recess adapted to receive the tang *y* of the drill and pinned to the lower end of the sub-tool holder *w* is a sleeve 1 provided with the lug *g*, which, as described, is adapted to be engaged by the driving shoulders *f* to rotate the tool or drill. The milled out slots *e* are constructed as shown in Fig. 3 so as to leave a ridge of metal 2 around the recess opening *t* in order to give sufficient strength to that end of the holder or driving member. Obviously, the lugs carried by the sleeve 1 of the tool must be offset as shown in Fig. 4 to fit within these milled slots *e* and clear the ridge of metal 2.

As shown in Fig. 2 the enlarged central portion *c* of the holder or driving member is provided with a shoulder 3 adjacent the reduced end portion *d*. There is provided the space 4 between the inner face 5 of the plug *n* and the shoulder 3 of the holder or driving member *a*. The plug limits the movement of the shell upwardly while the inwardly extending conical flange *k* which bears against the bevelled shoulder *i* of the holder, limits the downward movement of the shell. As the tang of the driving member is securely held within the socket of the drill press head, the shell is held in its lower position as shown in Fig. 2 by gravity, thereby causing the keys or gripping members to engage the groove *v* carried by the tool shank *w*.

When it is desired to release the tool so that the same may be withdrawn from the chuck, the operator will grip the tool by gripping the sleeve 1, his fore finger engaging with the bevelled surface *o* of the plug *n*. On applying pressure with his forefinger to this bevelled surface *o* he will force the plug *n* and shell *j* to which it is secured, upwardly. The inner face 5 of the plug is adapted to abut the lower end 6 of the key *p*, and therefore the key will be caused to be forced upwardly together with the shell. Since the tongue portion *q* of the key is engaged in the milled slot *s* which is inclined substantially 30 degrees to the axis of the chuck the key will be forced upwardly and outwardly retracting the same from the groove *v* as shown in Fig. 7. The inner face 5 of the plug will then abut the shoulder 3 of the holder limiting the upward movement of the sliding shell. As seen in Fig. 7 the key *p* has been forced upwardly and outwardly the back edge of the key located near the inner face of the shell, the key being retracted entirely within the key-way slot and in a non-interfering position with respect to the groove in the tool shank. The tool may now be withdrawn since there is nothing to interfere with its removal from the recess *t*. When the operator releases the pressure on the bevelled surface *o* of the plug *n* by withdrawing the tool from the holder, the shell *j* is forced by gravity into the position as shown in Fig. 2.

When the operator desires to insert another drill he merely forces the shank of the tool up into the tool holder the bevelled end 10 of the tool shank pushing the key *p* aside. The said key is again urged by gravity into engagement with the groove v carried by the tool shank w when the said tool is forced upwardly to the limit of its travel.

The tool is now held securely in place and cannot be withdrawn except by actuating the shell or sleeve as described.

The tool is adapted to be rotated in either direction and there are no projections or slots exposed on the outside surface of the chuck thereby providing a chuck that can be safely gripped at any time without any danger to the operator.

The chuck is adapted to be permanently secured on the driving member a and since the keys p will wear slightly in time, the chuck must be so arranged that it can be easily disassembled in order to replace the worn parts. To do this I have provided an auxiliary tool (Fig. 10) consisting of a spring member 11 provided with a laterally extending pin 12 riveted thereto. This tool is possessed by the foreman or a tool crib man who are the only ones that may be authorized to disassemble the chuck in order to replace worn parts. In the plug n, I have provided a hole 13 (Fig. 7) and a hole 14 within the reduced portion d of the driving member. These 2 holes can be arranged to be in alignment at either position of the chuck parts and the spring tool 11 can then be inserted into the recess t and the pin 12 thrust into the holes 13 and 14 which will lock the plug and holder a together. The tang b of the holder may be held in a vise which holds the plug and holder stationary and a special wrench may be fitted around the shell and arranged to grip the same, so that the shell can be unscrewed from the plug n without roughing the polished outer surface of the sleeve or the plug and the keys may be removed and new ones put in their place.

In Figs. 11, 12, and 13 I have shown a modified form of construction in which I replace the key member p by a pair of pins 15 and 16. The pin 15 is fitted into a hole drilled into the enlarged central portion c beginning at the bevelled surface i and extending inwardly and downwardly at an angle substantially 30 degrees to the axis and breaking out into the recess t. The inner end of the pin 15 has a conical bearing surface 17 and the pin 16 is adapted to abut this said conical bearing surface 17 at all times, the outer end of the pin 16 bearing against the inner face 5 of the plug n.

As shown in Fig. 11 the shell is in its lowermost position and the pins are forced inwardly the inner end of the pin 15 engaging within the groove v of the tool shank, thereby gripping the tool and holding the same in place and the outer end of the pin engaged by the inwardly extending flange k of the shell. The operator grips the tool as before described and actuates the plug n in the same manner as before which forces the pin 16 upwardly and as pin 16 engages the bevelled surface 17 of the pin 15 it will cause the pin 15 to move upwardly and outwardly assuming the position as shown in Fig. 12 thereby releasing the tool shank so that it can be withdrawn from the recess t. This pin construction is provided with sufficient clearance so that the pin 16 will not enter the recess t and the pin 15 which is pushed outwardly as well as upwardly has sufficient clearance with respect to the shell j so that it may be entirely retracted from the recess t.

In the claims I have broadly stated the different elements as consisting of a holder, a shell which comprises the shell or sleeve j and the plug n, and a tool which comprises the shank w, the drill y and the sleeve 1 since these tool parts could conceivably be integrally constructed from one piece of material.

What I claim is:

1. A quick change chuck, having in combination a holder provided with a recess to receive a tool and having guideways therein inclined at an angle to the longitudinal axis of said recess, said tool provided with a circumferential groove, a gripping member slidably supported by the holder in said inclined guideways, and a shell slidably supported by the holder and enclosing the same, said shell engaging the gripping member to yieldably project the same into the recess, said gripping member engaged by the tool on the insertion of the tool in the recess and retracted in said guideway to allow the end of the tool to slip by and the gripping member to again engage the groove carried by the tool for securing the tool in the holder.

2. In a quick change chuck, having in combination, a holder provided with a recess to receive a tool and having guideways therein inclined at an angle to the longitudinal axis of said recess, said tool provided with a circumferential groove, a gripping member slidably supported by the holder in said inclined guideways, and a shell slidably supported by the holder and enclosing the same, and provided with means for engaging the top and bottom of the gripping member, said shell provided with a relatively smooth exterior surface circular in cross section, whereby the same may be gripped while the holder is rotating, said shell yieldably projecting the gripping member into the recess carried by the holder, said gripping member engaged by the tool on the insertion of the tool in the recess and retracted in said guideway, thereby raising the shell to allow the end of the tool to slip by and the gripping member to again engage in the groove carried by the tool for securing the tool in place, said tool released while rotating by an upward movement of the shell which retracts the gripping member in the guideways.

3. A quick change chuck, having in combination a holder provided with a recess to receive a tool and having keyway slots therein inclined at an angle to the longitudinal axis of said recess, said tool provided with a circumferential groove, a key slidably supported by the holder in said inclined keyway slots, and a shell slidably supported by the holder and enclosing the same, said shell engaging the keys to yieldably project the same into the recess, said keys retractable in said keyway slots by either an upward movement of the shell or by the insertion of a tool in the recess, the said shell yieldably projecting the key into the recess to engage the groove carried by the tool when inserted in place for securing the tool in the holder.

4. A quick change chuck, having in combination, a holder provided with a recess to receive a tool and having guideways therein inclined at an angle to the longitudinal axis of said recess, a gripping member slidably supported by the holder in said inclined guideways, and a shell slidably supported by the holder and enclosing the same, said shell engaging the gripping member to yieldably project the same into the recess and provided with a smooth exterior surface whereby the shell may be grasped by the hand while the holder is rotating, said gripping member retractable in said guideways by an upward movement of the shell, or by the insertion of a tool in the recess while the holder is rotating.

5. In a drill chuck in combination a body provided with an enlarged cylindrical midportion having spaced external shoulders thereon, said midportion having a longitudinal radial slot therein and also provided with an inclined slot extending inwardly and downwardly from the upper one of said shoulders, said slots communicating with each other at an angle, a key longitudinally and radially movable in said longitudinal slot, said key being provided with a guide flange movable in said inclined slot, an outer sleeve loosely and longitudinally movable upon said body, said sleeve being provided with spaced internal shoulders, engageable in turn with the extremities of said key and an internal collet provided with an annular groove adjacent to its inner end, said key being provided with an inwardly extending projection, said projection engageable with said annular groove when said key is engaged by the upper shoulder on said sleeve and disengaged therefrom when said key is engaged by the lower shoulder on said sleeve.

6. In a drill chuck in combination a body provided with an enlarged cylindrical midportion having spaced external shoulders thereon, said midportion having a longitudinal radial slot therein and also provided with an inclined slot extending inwardly and downwardly from the upper one of said shoulders, said slots communicating with each other at an angle, a key longitudinally and radially movable in said longitudinal slot, said key being provided with a guide flange movable in said inclined slot, an outer sleeve loosely and longitudinally movable upon said body, said sleeve being provided with spaced internal shoulders, engageable in turn with the extremities of said key and an internal collet provided with an annular groove adjacent to its inner end, said key being provided with an inwardly extending projection, said projection engageable with said annular groove when said key is engaged by the upper shoulder on said sleeve and disengaged therefrom when said key is engaged by the lower shoulder on said sleeve, said shoulders on said body acting as stops to limit the movements of said sleeve.

7. In a drill chuck in combination a body provided with an enlarged cylindrical midportion having spaced external shoulders thereon, said midportion having a longitudinal radial slot therein and also provided with an inclined slot extending inwardly and downwardly from the upper one of said shoulders, said slots communicating with each other at an angle, a key longitudinally and radially movable in said longitudinal slot, said key being provided with a guide flange movable in said inclined slot, an outer sleeve loosely and longitudinally movable upon said body, said sleeve being provided with spaced internal shoulders, engageable in turn with the extremities of said key and an internal collet provided with an annular groove adjacent to its inner end, said key being provided with an inwardly extending projection, said projection engageable with said annular groove when said key is engaged by the upper shoulder on said sleeve and disengaged therefrom when said key is engaged by the lower shoulder on said sleeve, said shoulders on said body acting as stops to limit the movements of said sleeve, said sleeve being manually pivoted to raise said key and operated by gravity to depress said key and lock said collet in position.

8. In a drill chuck in combination a body provided with an enlarged cylindrical midportion having spaced external shoulders thereon, said midportion having a longitudinal radial slot therein and also provided with an inclined slot extending inwardly and downwardly from the upper one of said shoulders, said slots communicating with each other at an angle, a key longitudinally and radially movable in said longitudinal slot, said key being provided with a guide flange movable in said inclined slot, an outer sleeve loosely and longitudinally movable upon said body, said sleeve being provided with spaced internal shoulders, engageable in turn with the extremities of said key and an internal collet provided with an annular groove adjacent to its inner end, said key being provided with an inwardly extending projection, said projection engageable with said annular groove when said key is engaged by the upper shoulder on said sleeve and disengaged therefrom when said key is engaged by the lower shoulder on said sleeve, said shoulders on said body acting as stops to limit the movements of said sleeve, said sleeve being manually pivoted to raise said key and operated by gravity to depress said key and lock said collet in position, said sleeve being bevelled on its lower and outer edge to permit raising the same by the use of one hand when the collet is grasped in said hand.

9. A chuck including a holder provided with a recess to receive a tool element, a gripping member slidable longitudinally of and guided in the holder, the latter being also provided with angularly related guiding means for guiding the gripping member, inwardly or outwardly simultaneously with the longitudinal downward or upward movements of the gripping member the latter be- provided at its inner edge with a longitudinally disposed tool engaging projection and a shell partially enclosing the holder and having a limited longitudinal sliding movement thereon and arranged to engage the ends of the gripping member for holding the same in engagement and for lifting the gripping member out of engagement with the tool element, said projection being adapted to be engaged by the tool element for moving the gripping member longitudinally and for simultaneously lifting the shell.

10. A chuck including a holder provided with a recess, gripping members slidable longitudinally of and guided in the holder, the latter being also provided with angularly related means for guiding the gripping members for causing the same to move inwardly or outwardly simultaneously with their longitudinal downward or upward movement, said gripping members being provided at their inner edges with longitudinal projections having oppositely inclined upper and lower edges, a shell partially enclosing the holder and having interior means for engaging the gripping members for holding the same in engagement and for lifting the gripping members out of engagement and a tool element fitting in the recess of the holder and provided with an oppositely beveled groove receiving the projections of the gripping members and adapted to fit against the inclined edges thereof.

11. A chuck including a holder provided with a recess, gripping members slidable longitudinally of and guided in the holder, the latter being also provided with angularly related means for guiding the gripping members for causing the same to move inwardly or outwardly simultaneously with their longitudinal downward or upward movement, said gripping members being provided at their inner edges with longitudinal projections having oppositely inclined upper and lower edges, a shell partially enclosing the holder and having interior means for engaging the gripping members for holding the same in engagement and for lifting the gripping members out of engagement and a tool element fitting in the recess of the holder and provided with an oppositely beveled groove receiving the projections of the gripping members and adapted to fit against the inclined edges thereof, said tool member being also provided with a beveled upper end arranged to engage the said projections at the inclined lower edges thereof to lift the gripping members and the said sleeve when the tool element is introduced into the holder.

In testimony whereof I affix my signature.

CHALON E. BRIDWELL.